United States Patent [19]

Luers

[11] 4,361,187

[45] Nov. 30, 1982

[54] DOWNHOLE MIXING VALVE

[75] Inventor: Thomas J. Luers, Duncan, Okla.

[73] Assignee: Halliburton Company, Duncan, Okla.

[21] Appl. No.: 123,152

[22] Filed: Feb. 21, 1980

[51] Int. Cl.³ ............................................. E21B 34/00
[52] U.S. Cl. .................................. 166/326; 137/860; 137/896
[58] Field of Search ................... 166/285, 202, 51, 56, 166/191, 326; 137/895, 896, 860, 605

[56] References Cited

U.S. PATENT DOCUMENTS

| | | | |
|---|---|---|---|
| Re. 26,319 | 12/1967 | Tamplen | 166/326 |
| 1,854,518 | 4/1932 | Little | 166/326 |
| 2,248,125 | 7/1941 | Scaramucci | 166/327 |
| 2,257,765 | 10/1941 | Scaramucci | 166/327 |
| 2,716,454 | 8/1955 | Abendroth | 166/ |
| 3,153,451 | 10/1964 | Chancellor et al. | 166/51 |
| 3,276,523 | 10/1966 | Oliver | 166/326 |
| 3,422,903 | 1/1969 | Jansson | 166/326 |

Primary Examiner—James A. Leppink
Attorney, Agent, or Firm—Joseph A. Walkowski; John H. Tregoning

[57] ABSTRACT

A mixing valve for use in cementing, fracturing or other treatment of a well. The valve, which may be mounted in a pipe string, comprises a center mandrel surrounded by a coaxial housing having circumferentially spaced apertures therethrough. A packer cup surrounds the center mandrel below the apertures in the housing, and seals the annulus between the mandrel and housing when the pressure of fluid through the bore of the mandrel exceeds that on the outside of the chamber. When mixing fluids, it is only necessary to pressure the fluid outside the housing to collapse the packer cup against the mandrel, the fluid from the outside then entering the stream flowing from the mandrel bore. A method of mixing fluids utilizing the valve of the present invention is also disclosed.

16 Claims, 4 Drawing Figures

DOWNHOLE MIXING VALVE

It is common practice in the petroleum industry to introduce numerous different fluids and slurries into wells. These are generally composed of multiple components which are mixed together at the well site. In some cases, it is possible to formulate the fluid or slurry (hereafter generally referred to as fluid) at the surface and introduce it into the well in its fluid form. However, in many instances it is impractical or impossible to mix the components above ground. For example, when a well is cemented, particularly during a process known as squeeze cementing, additives are employed to alter the set time and physical characteristics of the cement. Squeeze cementing can be employed to isolate adjacent zones in a well, seal a lost circulation zone, repair casing leaks, remedy an initially defective casing cement job, eliminate water intrusion into a producing zone, and for a number of other purposes. In a squeeze job, an area of casing is usually isolated from the well bore above, and if necessary, below. The interval to be squeezed, unless it is for the purpose of repairing a casing leak, has been perforated. Cement is then forced through the protrusions into the formation surrounding the interval. Depending on the purpose, depth and volume of the squeeze, it may be necessary to mix additives with the cement to retard setting time, accelerate setting time, control fluid loss in the cement, gel the cement, reduce the slurry density, lighten the slurry or increase its weight, increase its mechanical strength when set, reduce the effect of mud on the cement, improve its bonding, or to effect more than one of the above purposes, as well as others. It is the usual practice to mix additives on the surface and then pump the cement into the well, or to pump some cement, pump some additive, pump some more cement, some more additive, etc., and hope that acceptable mixing takes place downhole. The former procedure has the obvious drawback that an additive such as an accelerator or retarder starts working as soon as it contacts the cement, and one is never certain that the mixed cement will reach the desired interval at the correct time, causing set up in the pipe string if one has estimated too short a time before the cement enters the formation, and a defective squeeze job if setting is delayed too long after the cement enters the formation. The latter method also has the disadvantage of uncertainty of result, as the operator is never positive that the mixing will actually take place downhole, and that the required bond, gel, setting time, etc., will ever be achieved. As a consequence, the operator tends to utilize a greater proportion of additives than is actually necessary to ensure that the desired modification to the cement characteristics takes place. This, of course, costs the customer more money, and there is the possibility that too much additive will, in fact, mix with the cement and give undesirable results.

Other well operations, such as fracturing, also presently suffer from a number of problems in execution. It is frequently desirable to direct high pressure fracturing fluid into a formation through a tubing string to effect the initial fracture and subsequently, in order to provide an adequate volume of flow to introduce proppants into the formation, to pump down both the tubing string and the annulus surrounding it. This necessitates some sort of valve arrangement immediately above a packer used to isolate the zone to be fractured, which valve arrangements are generally mechanical in nature and require some sort of manipulation of the tubing string to operate. Due to this deficiency, there is an ever present danger of failure of operation. Other well treating operations, such as acidizing and stimulation, also involve mixing of various components to inject into the well. Present mixing suffers from the same disadvantages as heretofore enumerated with respect to other treatments, and it should also be noted that almost all of the well treatments employed involve some hazard to operating personnel due to the toxicity of the fluid components and some reaction products when mixing takes place on the surface before injection.

One such attempt to alleviate at least some of the above mentioned disadvantages is disclosed in U.S. Pat. No. 3,276,523, issued on Oct. 4, 1966 to Owen N. Oliver, and assigned to Halliburton Company. The Oliver device, referred to as a "crossover valve apparatus," comprises a generally cylindrical housing having circumferentially spaced apertures therethrough, and a plurality of fingers disposed against these apertures on the interior of the housing. When the differential pressure across the apertures is greater on the interior of the housing, the fingers are pressed over the apertures, sealing them; if the reverse occurs, fluid pressure forces them inward, permitting fluid from the exterior of the housing to enter the apparatus and travel downhole. While providing a pressure responsive valve, the Oliver apparatus possesses a number of inherent disadvantages. The use of individual fingers increases the opportunity for structural failure, whether or not they are metal-reinforced, due to abrasion and turbulence. Not only are the fingers acted upon by the fluid from outside the housing, but are forced into the main stream of flow down the bore of the housing. Even if a one-piece web encompassing the fingers is employed, as appears to be the case in an alternative embodiment, the web is again exposed to the main stream of flow down the bore of the housing. In addition, should the direction of flow be reversed and fluid taken up the tubing string through the bore of the housing, the back flow will tend to "wrap" the fingers up into the bore, as there is no reinforcing member backing them.

In contrast, the present invention contemplates an outer housing with circumferentially spaced apertures therethrough coaxially surrounding a center mandrel upon which is mounted a packer cup, preferably made of an elastomer. The packer cup is located downstream of the apertures and, when the differential pressure is greater in the bore of the mandrel than on the outside of the housing, the skirt of the packer cup is forced against the interior of the housing, creating a seal. If the pressure is greater outside the housing than within, fluid from outside the housing enters the tool and the tubing string. The mixing valve of the present invention, by mounting the packer cup around the mandrel, upstream of where the flow from the mandrel bore enters the mixing chamber, protects the packer cup from abrasive and turbulent fluid effects. Moreover, as the packer cup is collapsed inwardly against the exterior of the mandrel when the pressure outside the housing is raised to exceed that in the tubing string, mechanical reinforcement is provided. The packer cup also collapses into an annular recess, thus being placed outside of much of the main flow from outside the housing. Should it be desired to lower the mandrel bore pressure enough to reverse the flow up the tubing string, fluid flow will enter the mandrel below the cup, turning inwardly at the metal mouth of the mandrel. During a cementing operation, it would be a normal procedure to place the additives on the outside of the housing and flow cement through the mandrel bore, increasing the housing annulus pressure sufficiently to mix additive when desired. In a similar manner, it may be seen that fracturing fluid may be pumped down the housing annulus to increase the volume of flow once the initial fracture is achieved by flow through the tubing string. Additives for fracturing may be mixed in a similar manner to those for cementing.

While reference has been made to use of the apparatus of the present invention in fracturing and cementing, additives for acidizing a well may be injected in a similar manner, as may mud removal compositions, clay stabilizers, surfactants, paraffin control reagents and many other compositions used in fluid injection processes. The advantage of mixing toxic and reactive chemicals below ground is attractive from the standpoint of operator safety and compliance with many new government regulations regarding the handling of toxic substances.

Thus, it can be seen that the present invention provides many new and varied advantages over the prior art, without any inherent disadvantages. Other, even more varied uses than are enumerated above will, of course, be obvious to those of ordinary skill in the art. The foregoing advantages and the preferred embodiments of the invention will be better understood from the following description taken in conjunction with the accompanying drawings wherein.

Figure 1:
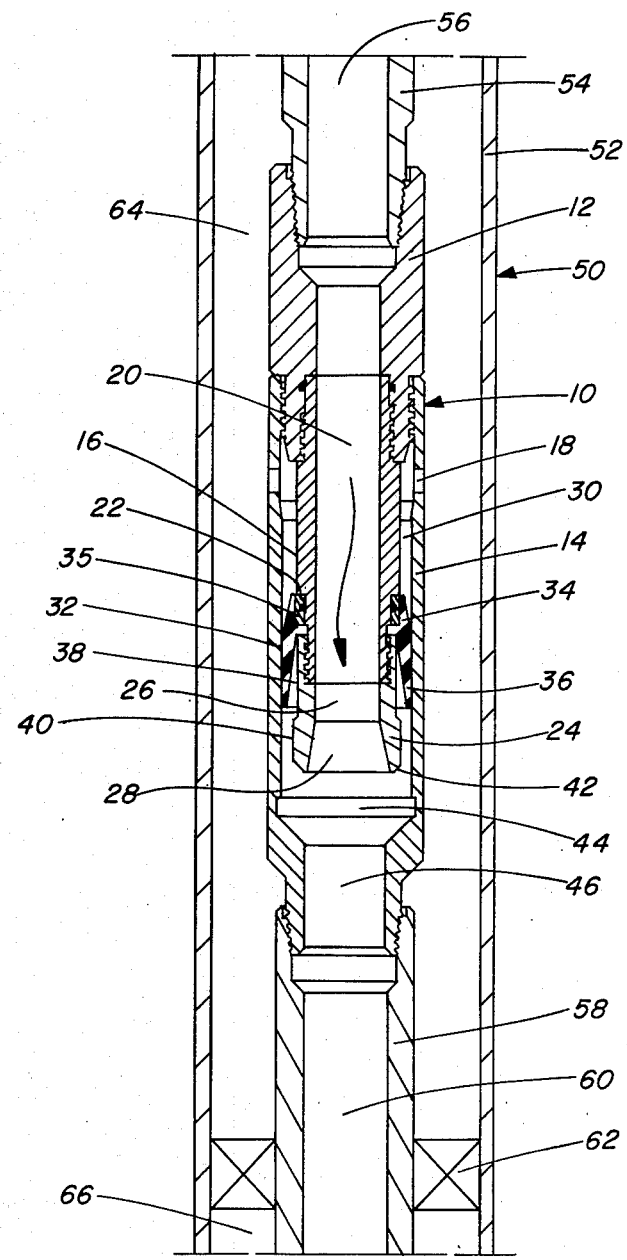
FIG. 1 is a vertical cross-sectional elevation of the mixing valve of the present invention disposed in a well bore with fluid flow down the tubing string.

Referring to FIG. 1, a preferred embodiment of the mixing valve of the present invention is shown wherein mixing valve 10 comprises a crossover body 12 to which are threadably attached substantially cylindrical housing 14 and substantially tubular mandrel 16. Housing 14 has circumferentially spaced apertures 18 through its wall. Crossover body 12 and mandrel 16 have axially aligned bores of substantially the same diameter designated by the reference character 20. On the exterior of mandrel 16 is disposed shoulder 22. Threadably attached to mandrel 16 is diffuser nose 24, leaving a bore 26 substantially the same as bore 36 at its upper end, and a gradually increasing wall diameter defining a frusto-conically shaped exit bore 28. Between mandrel 16 and housing 14 is valve annulus 30, with which apertures 18 communicate. Longitudinally below apertures 18, packer cup 32 is disposed around mandrel 16, abutting shoulder 22. Packer cup 32 comprises an upper base portion 34 disposed about and bonded to packer ring 35, a fluid-tight seal between mandrel 16 and packer ring 35 being effected by an O-ring (unnumbered). Packer cup 32 further comprises a lower, flexible skirt portion 36. As shown in the drawings, packer cup 32 is preferably formed of an elastomeric substance. Packer cup 32 is retained on mandrel 16 by diffuser nose 24, which possesses an upper surface of reduced outer diameter 38 followed by a lower portion of increased diameter 40, and an inwardly chamfered tip 42. Below diffuser nose 24 inside housing 14 is an area comprising mixing chamber 44. Below mixing chamber 44 is lower valve bore 46, of lesser diameter.

The preferred embodiment described above in conjunction with FIG. 1 is, of course, not the only manner in which the mixing valve may be structured. For example, if greater seal redundancy is desired, multiple packer cups could be employed on mandrel 16. While a plurality of apertures 18 are shown, one aperture through housing 14 would suffice for operation of the valve. While the crossover body 12, housing 14 and mandrel 16 are shown as three separate pieces, it would, of course, be obvious to combine crossover body 12 and mandrel 16, or housing 14. A packer cup without packer ring 35 may be employed and a longer or shorter mixing chamber could be utilized. Furthermore, it would be obvious to form a sealing member in lieu of the disclosed packer cup, which sealing member would be mounted on the inside wall of the housing and would possess a skirt extending inwardly to the mandrel and angled away from the apertures. The sealing member, preferably formed of an elastomer, would react to pressure differentials in the same manner of a packer cup skirt, and would be inserted in an annular recess in the housing, or gripped between portions of a two-piece housing tightened together.

Figure 2:
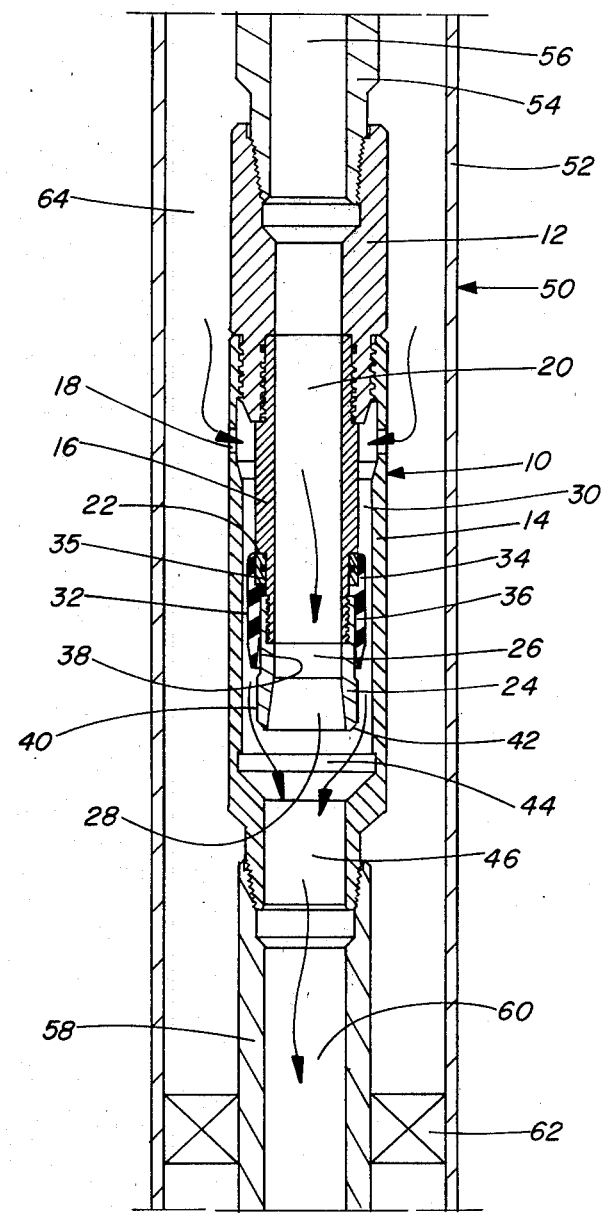
FIG. 2 is a vertical cross-sectional elevation of the mixing valve with collapsed packer cup due to flow down the annulus between the casing and tubing string.

Referring to FIGS. 1 and 2, mixing valve 10 is depicted in a typical installation in a well bore 50. The well bore is lined with casing 52, and mixing valve 10 is disposed within the casing 52 as a part of a tubing string, the upper part of which is designated by the reference character 54, having bore 56, and the lower part of which is designated by the reference character 58, and has bore 16. Below mixing valve 10 as a part of tubing string 58 is packer 62 shown schematically, sealing across the space between the casing 52 and tubing string 58, thus isolating the annulus 64 above packer 62 from that 66 below packer 62. A suitable packer which may be employed in this fashion is the CHAMP ® II packer, described on page 3475 of Halliburton Services Sales and Service Catalog Number 40. Below the packer 62 is a producing zone, not shown, into which fluid may be pumped to effect a fracture, for example, or for other treatment purposes.

As shown in FIG. 1, fracturing fluid may be pumped down the tubing string bore 56 through mixing valve 10 to tubing string bore 60 to the zone interval at a sufficient pressure to effect a fracture. The well bore annulus 64 is isolated from the tubing string bore 8 and mixing chamber 44 as the differential pressure inside the mixing valve 10 forces skirt 36 of packer cup 32 against the inside of housing 14, creating a fluid-tight seal. As noted previously, a seal between packer cup 32 and mandrel 16 is achieved through use of an O-ring. After the initial fracture has taken place, an additional volume of fluid can be pumped to the formation by increasing the pressure in the well bore annulus 64, which acts upon packer cup 32 through apertures 18 in housing 14. This additional fluid, of course, may be an additive or may be more of the same fluid as is in the tubing string if only an increase in flow volume is sought. The increased pressure in well bore annulus 64 collapses skirt 36 into the annular recess formed by reduced diameter area 38 on diffuser nose 24, fluid then flowing down to mixing chamber 44 through valve annulus 30 where it meets that from central bore 20 and continues downhole. The frusto-conical shape of lower bore 28 lowers the velocity of fluid emerging from diffuser nose 24, so as to lessen turbulence and its accompanying erosive effects, particularly when fluid from outside the mixing valve 10 is forced through valve annulus 30 to mixing chamber 44. The chamfered edge on the end of diffuser nose 24 is also designed to alleviate the turbulence of fluid emerging from valve annulus 30 into mixing chamber 44. Between mixing chamber 44 and lower valve bore 46, the angle of the communicating wall may be decreased to provide a more gradual transition if desired, to provide a more gradual acceleration of fluid back into tubing string bore 60. Should it be desired to clear the tubing string of fracturing fluid after the operation is over, a release of pressure on tubing string bore 56 will result in fluid traveling down well bore annulus 64, through apertures 18, into valve annulus 30 past packer cup 32, into diffuser nose 24 to bore 36 and back up tubing string 54 through bore 56.

Of course, the addition of fluid from the well bore annulus 64 may be utilized in other operations, such as acidizing, where the mixing valve would be placed close to the surface and inhibitors as well as other additives mixed and then injected down to the zone through the tubing string. In similar fashion, mud-removal fluids, surfactants, etc. may be formulated below the surface with minimal toxicity and hazard to the operator.

A two-stage cementing operation, such as one to stop brine encroachment into a well, may also be accomplished. An additive which reacts with the brine to form a gel may be pumped down the annulus and through the mixing valve with the tubing string shut off at the surface, and subsequently pumping a cement slurry down the tubing string to permanently seal off the gelled brine.

Figure 3:
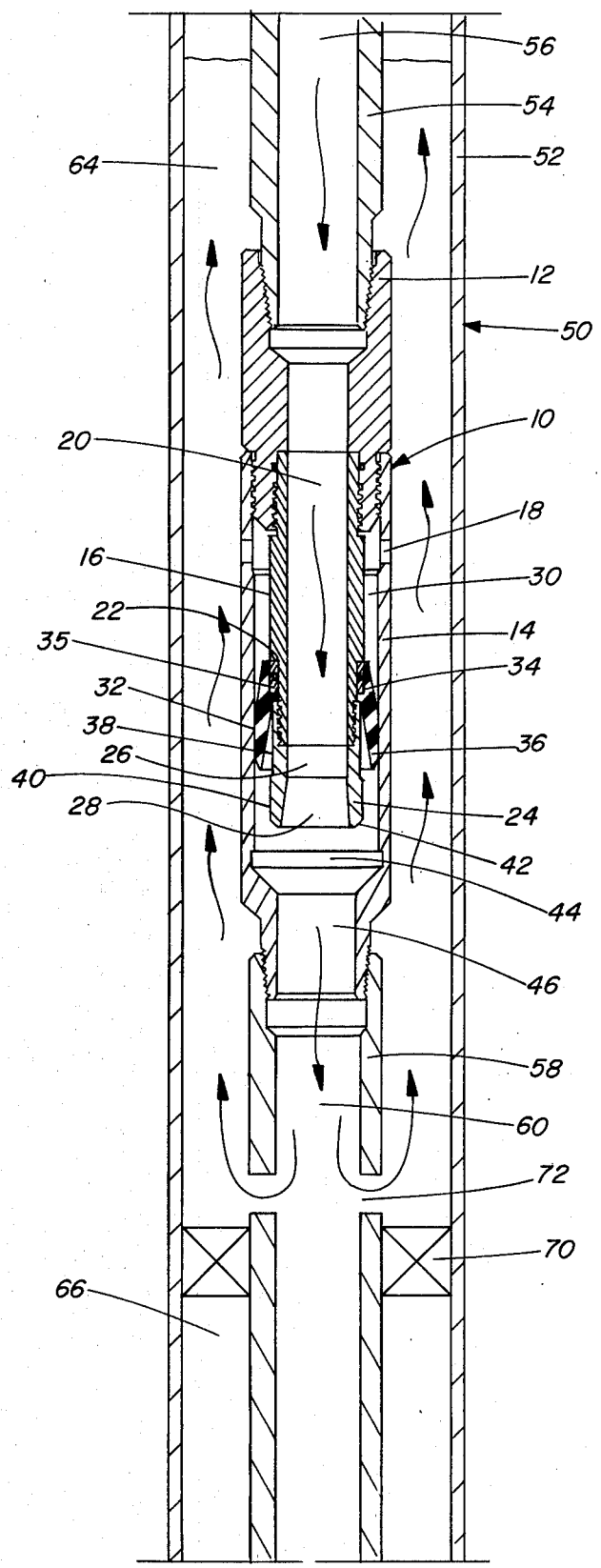
FIG. 3 is a vertical cross-sectional elevation of the mixing valve with a packer and open circulation valve (shown schematically) in the well bore, circulating fluid down the tubing string and into the annulus.
Figure 4:
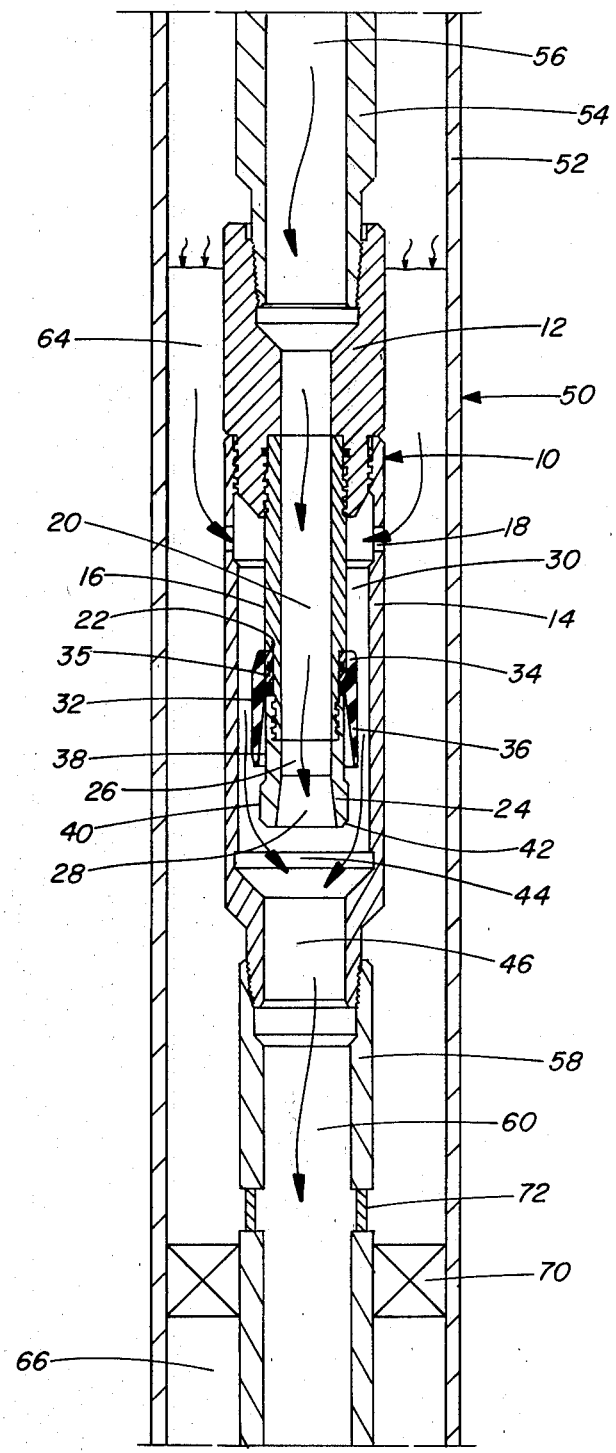
FIG. 4 is a view similar to FIG. 3, but with the circulating valve closed and fluid flow down both the tubing string and well bore annulus.

If more versatility of mixing and circulation is desired, mixing valve 10 may be placed in a tubing string as noted previously, but with a packer and circulating valve combination, as shown schematically in FIGS. 3 and 4. A suitable packer with circulating valve designated by reference numerals 70 and 72, respectively, for this application could be the Halliburton RTTS Retrievable Test-Treat-Squeeze Packer described on pages 3476 and 3477 of the Halliburton Services Sales and Service Catalog Number 40. Such an arrangement may be employed in squeeze cementing, the circulating valve being used to place additives in the annulus 64 adjacent the mixing valve 10. By way of illustration, a predetermined quantity of accelerator followed by a clean fluid may be pumped down tubing string bore 56, through mixing valve 10 and out into annulus 64 through open circulating valve 72, as shown in FIG. 3. The accelerator does not travel below circulating valve 72 due to the hydrostatic pressure in the tubing string below the valve. If mixing valve 10 is placed immediately above the circulating valve, the accelerator will soon rise to a level above apertures 18, where it is maintained by shutting off annulus 64 at the surface. After closing circulating valve 72, (FIG. 4) cement can now be pumped down tubing string bore 56 to mixing valve 10, whereupon the pressure in well bore annulus 64 may be raised, forcing the accelerator into valve annulus 30, where it collapses packer cup 32 and enters mixing chamber 44 where natural turbulence achieves a relatively uniform mixing of the additive. Thus, it can be seen that a number of advantages are derived from the use of the present invention. Not only can the quantity of additive required be more accurately determined, but the timing to set up is greatly enhanced, due to the mixing downhole in proximity to the squeeze itself, and also to the uniform mixing of the additive with the cement. Retardants, gelling agents, and other additives as heretofore discussed may also be mixed in the same advantageous manner. The type of two-stage brine control cementing operation may also be effected in this manner, if it is not desired to drive the formation fluids into the formation ahead of the gelling agent. Again, as discussed previously, if it is desired to mix near the surface, this is easily achieved by merely moving the mixing valve with packer and circulating valve to a higher location. Additives may also be pumped down the well bore annulus with the circulating valve open, filling the annulus, and pumping of additional additive continued from the surface during the cementing or other operation if the volume of additive required exceeds the annulus volume available. The fluid in the well bore annulus will be displaced into the tubing string during the initial annulus filling procedure.

While the present invention has been shown in the form of certain preferred embodiments, it is readily apparent as noted above that modifications of the method and apparatus disclosed herein would be readily apparent to those of ordinary skill in the art. It is therefore to be understood that the present invention is not limited to the specific configurations, arrangements or flow patterns herein described and illustrated. Furthermore, the mixing valve of the present invention is not limited to applications in the petroleum industry. Wherever mixing or adding two fluids is desired, with a pressure-responsive shutoff, an apparatus incorporating the mixing valve of the present invention is applicable. Therefore, numerous modifications, additions, deletions and substitutions may be made without departing from the spirit and scope of the claimed invention.

I claim:

1. A downhole valve, comprising:
    tubular housing means;
    imperforate tubular mandrel means having a free end opening into said housing;
    imperforate crossover body means having a cylindrical bore therethrough coaxial with and opening into the bore of said mandrel means, said housing means and said mandrel means defining an annulus therebetween and being coaxially affixed at one end to said crossover body means;
    port means through the wall of said housing means adjacent the crossover means;
    pressure responsive seal means in said annulus and being substantially axially spaced from said port means, said pressure responsive seal means attached to one of said housing and mandrel means and being located between said port means and the ree end of said mandrel means, said seal means allowing flow through said annulus past said seal means and preventing flow in the opposite direction.

2. The apparatus of claim 1 wherein said pressure responsive seal means closes in response to a positive pressure differential on the side of said seal means opposite said port means.

3. The apparatus of claim 2 wherein said seal means comprises packer cup means.

4. The apparatus of claim 1 wherein the free end of said housing means overshoots the free end of said mandrel means, defining a mixing chamber into which the bore of said mandrel means axially opens.

5. The apparatus of claim 4 wherein the exit portion of said mandrel bore to said mixing chamber is flared in a frustoconical shape.

6. The apparatus of claim 4 wherein said port means comprises at least one aperture.

7. The apparatus of claim 6 wherein said pressure responsive seal means comprises a first and a second portion, said first portion comprising a base, and said second portion comprising a skirt.

8. The apparatus of claim 7 wherein said skirt extends radially at an acute angle to the axis of said mandrel.

9. The apparatus of claim 8 wherein said skirt extends axially away from said port means.

10. The apparatus of claim 9 wherein said skirt extends radially outward and said base is fixed to said mandrel means.

11. The apparatus of claim 10 wherein at least said skirt comprises an elastomer.

12. The apparatus of claim 11 wherein said selective seal means comprises packer cup means.

13. The apparatus of claim 12 wherein said housing is adapted to connect to first pipe means at one end of said valve, and said crossover body means is adapted to connect to second pipe means at the opposite end of said valve.

14. A downhole mixing valve adapted to be disposed in a well bore in a pipe string, comprising:
an imperforate crossover body having a substantially cylindrical bore therethrough;
a substantially tubular imperforate mandrel affixed at one end thereof to and extending axially from said crossover body, the bore of said mandrel being substantially coaxial with and in communication with said crossover body bore;
a substantially cylindrical housing coaxially surrounding said mandrel, affixed to and extending axially from said crossover body beyond the free end of said mandrel, said mandrel and said housing defining a valve annulus therebetween and said housing defining a mixing chamber at the end of said valve annulus, said mandrel bore opening axially into said mixing chamber;
pressure responsive annulus closure means attached to one of said mandrel and housing and disposed between said mandrel and said housing substantially axially spaced from said crossover body; and
at least one aperture through said housing between said crossover body and said annulus closure means at a location substantially axially spaced from said annulus closure means, said annulus closure means allowing fluid flow therepast in one direction and preventing flow in the opposite direction.

15. The apparatus of claim 14 wherein said annulus closure means is a packer cup.

16. The apparatus of claim 15 wherein said mixing valve is adapted to be affixed to said pipe string by said crossover body at one end and by said housing at the other end.

* * * * *